④ United States Patent
[11] 3,581,092

[72] Inventors Denton Pearsall
Stamford, Conn.;
Gerald Jankowitz, Hillsdale, N.J.
[21] Appl. No. 814,761
[22] Filed Apr. 9, 1969
[45] Patented May 25, 1971
[73] Assignee Barnes Engineering Company
Stamford, Conn.

[54] PYROELECTRIC DETECTOR ARRAY
5 Claims, 2 Drawing Figs.

[52] U.S. Cl. ........ 250/83.3, 250/83
[51] Int. Cl. ........ G01t 1/16
[50] Field of Search ........ 250/83, 83.3 (R)

[56] References Cited
UNITED STATES PATENTS

| | | | |
|---|---|---|---|
| 3,433,954 | 3/1969 | Bowman et al. | 250/83.3 |
| 3,453,432 | 7/1969 | McHenry | 250/83X |
| 3,465,150 | 9/1969 | Hugle | 250/83.3 |
| 3,480,777 | 11/1969 | Astheimer | 250/83X |

*Primary Examiner*—James W. Lawrence
*Assistant Examiner*—Davis L. Willis
*Attorneys*—Joseph Levinson and Robert Ames Norton

ABSTRACT: An array of thermal detectors for infrared radiation measurement is fabricated on a single piece of pyroelectric material. A common transparent electrode to the infrared radiation is applied thereto and positioned on one side of the layer of pyroelectric material facing the incident radiation, and a plurality of individual field-defining electrodes are mounted on the other side of the pyroelectric material. This structure is simpler and more reliable than an assembly of isolated detectors and is easier to fabricate by using vacuum-deposited leads on the mounting substrate.

INVENTOR.
DENTON PEARSALL
GERALD JANKOWITZ
BY
Joseph Levinson

PYROELECTRIC DETECTOR ARRAY

BACKGROUND OF THE INVENTION

The pyroelectric infrared radiation detector is a thermal detector. It offers a number of advantages over other types of infrared detectors, in that it requires no bias, is uniformly sensitive over a wide region in the infrared spectrum, requires no cooling, and the signal-to-noise ratio and detectivity remain nearly constant over a range of frequencies from DC to 2000 cps. Since the detector is not biased, there is no l/f (low frequency) noise generated in the detector, and this characteristic makes the detector particularly appealing for application in scanning systems where l/f noise interferes with the signal at low frequencies. One form of construction of a pyroelectric infrared detector is shown and described in an application entitled Pyroelectric Detector Assembly, Ser. No. 692,379, which is assigned to the assignee of the present application. In this construction, a pyroelectric crystal, with its associated electrodes, are mounted in an evacuated cavity along with the first stage of amplification in the form of a field effect transistor, and a load resistance for the field effect transistor for matching the high output impedance of the pyroelectric detector to that of the field effect transistor, so that the device may be utilized with conventional amplifiers, meters, and other utilization circuitry.

There is a great interest in detector arrays and mosaics for applications in thermal imaging systems. The absence of low frequency noise generated by the detector makes the pyroelectric detector particularly suitable for such applications. Although the structure of the aforesaid application may be used in such systems, an assembly of physically isolated pyroelectric detectors would be difficult to fabricate.

Accordingly, it is an object of the present invention to provide an array of pyroelectric infrared detectors which are easier to fabricate than an assembly of physically isolated detectors.

A further object of this invention is to provide a novel pyroelectric detector array which facilitates ease of fabrication and offers greater versatility in size, shape, and orientation of the mosaic or array pattern.

SUMMARY OF THE INVENTION

Pyroelectric detector arrays are constructed on single sections of pyroelectric crystalline material having a common transparent electrode placed on one side of the crystal facing the incident radiation, and individual, field-defining electrodes placed on the opposite side, wherein the detector area and spacing are governed by the individual electrodes.

DESCRIPTION OF THE PREFERRED EMBODIMENT

Figure 1:
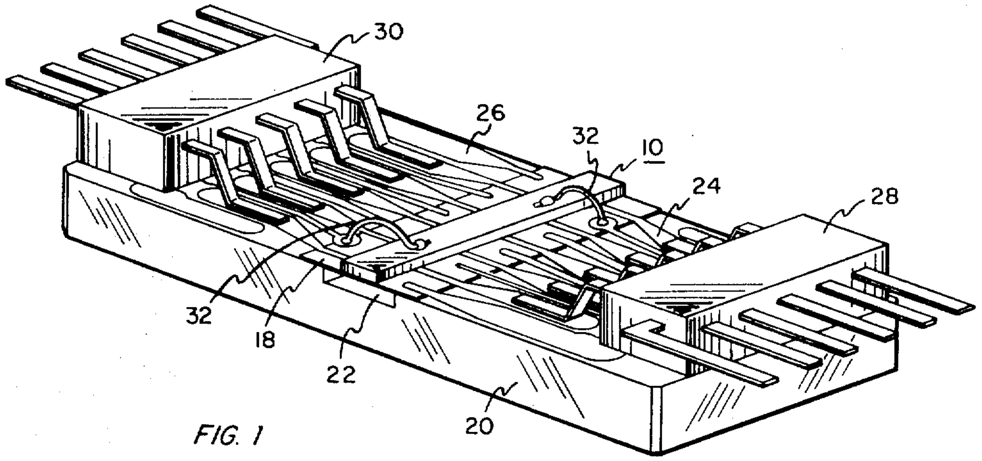
FIG. 1 is an isometric view of one form of pyroelectric detector array embodied in the present invention.
Figure 2:
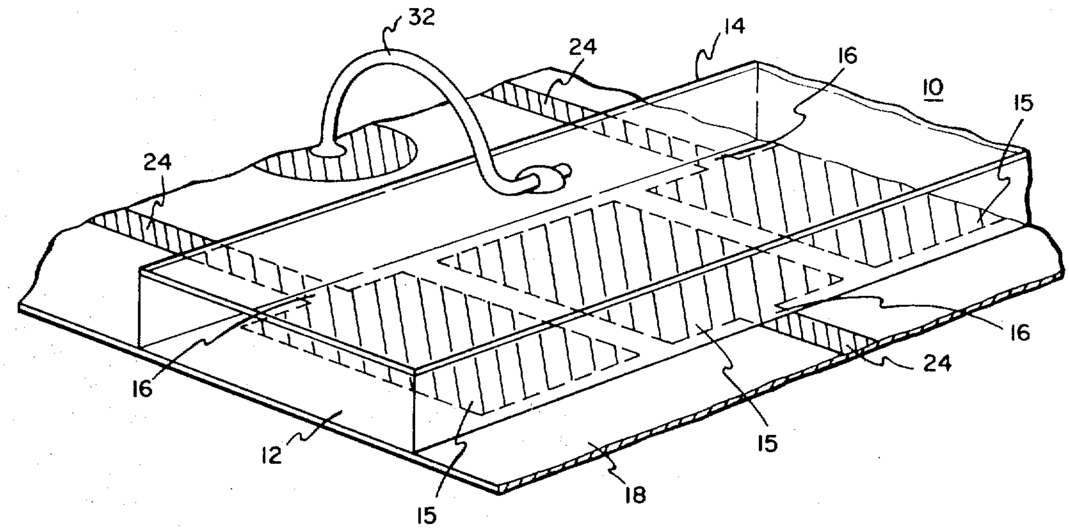
FIG. 2 is a greatly enlarged view of a section of the pyroelectric detector array shown in FIG. 1 to illustrate the type of electrode structure embodied in the present invention.

Referring now to FIGS. 1 and 2, and particularly to FIG. 2 for a description of the preferred embodiment of the pyroelectric detector array construction, such array is identified generally with the reference character 10. As will best be seen in FIG. 2, the pyroelectric detector array 10 is comprised of a very thin slab of pyroelectric crystalline material 12, sandwiched between a common electrode 14 and a plurality of field-defining electrodes 15. The pyroelectric crystalline material is a form of ferroelectric which can be electrically polarized and such materials exhibit temperature-dependent charge and permittivity effects. Since, in the present invention, an array or mosaic is provided, an additional requirement for the pyroelectric material is that it have low thermal diffusivity. Although the present invention is not considered limited thereto, triglycene sulfate (TGS) is one of the pyroelectric materials which have been found suitable for this application.

The common transparent electrode 14 is a single unitary electrode which faces toward the incident radiation applied to the array. The electrode 14 may be constructed of a nichrome layer having a resistance of 1000—10,000 ohms/square. The electrode 14 may be vacuum deposited on the pyroelectric material 12 and the electrode 14 thickness can be controlled within limits to provide an adequate conductor with a minimum of reflectance and absorption of incident radiation energy by the electrode. The use of the transparent electrode 14 eliminates the need for a blacking agent which simplifies the construction and reduces the thermal mass of the detector. It also permits an array construction with the field-defining electrodes 15 on the back side of the pyroelectric material 12 for ease of electrical connections which will be explained hereinafter. The fact that the common electrode 14 is transparent permits energy to be absorbed directly in the crystalline material 12 and the pyroelectric material such as TGS exhibits strong absorption in the 2—35$\mu$ region of the infrared.

On the side opposite the transparent common electrode 14, an array of individual field-defining electrodes 15 are deposited. There is no restriction on the shape, size, or orientation of this pattern of field-defining electrodes. The electrodes 15 are used to define the sensitive area of each detector element in the array, and form the other electrode of the capacitor. Detector area and spacing are governed by these individual field-defining electrodes 15 and they can be controlled precisely by means of vacuum deposition through apertures in photoetch masks. Accordingly, a wide variety of configurations can be readily provided. Of course, the spacing of the array will depend on the application and the modulation of the incoming incident radiation. It has been found in the present invention that the thermal diffusivity for TGS provides a thermal crosstalk of less than 1 percent for a modulation of 2 cycles or more with 6 mm., square electrodes separated by 0.6 mm.

The aforesaid construction is the heart of the invention, and offers many advantages in the utilization of the device, as well as its simplification in construction. FIG. 1 shows one useful configuration, but the invention is not considered limited to the illustrated array. Since the detectors are capacitors, the electrical impedance at the lower frequencies is extremely high, and in order to exploit the pyroelectric detector to its fullest, the electrical output must be processed through an extremely high impedance amplifier. To this end, field effect transistors are extremely useful in that they have very high input impedance, and provide a perfect impedance transformation device for the pyroelectric detector. The only requirement for the field effects transistor is that it have a very large input resistor that will load the detector. This concept has been discussed in the aforesaid application. Its importance with respect to the present invention deals with the construction of the array and the ease with which these principles may be carried out in accordance with this invention.

The pyroelectric detector array 10 is mounted on a Mylar strip 18 over a depression or opening 22 in a substrate 20. A lead pattern 24 is deposited on the Mylar strip 18 and on the substrate 20 comprising a lead for each field-defining electrode 15. Each field-defining electrode 15 has its own small lead 16 associated therewith which is adapted to be secured in conductive relation with the lead pattern 24 for providing external connections to each field-defining electrode 15. A load resistor pattern 26 is also provided interspersed between the lead pattern 24. Accordingly, by employing the lead and load resistor pattern, and utilizing the concept of surface leakage of different materials, a resistor of any value may be provided by merely varying the geometry of the interconnection pattern. The most important parameter is the aspect ratio of the gap of material between two electrodes on the same surface. By doing this, a resistor on the order of $10^{12}$ ohms is made an integral part of the interconnection pattern to provide a load resistor for each capacitor detective element in the array. The field effect transistor packs 28 and 30 are connected to the lead pattern 24 by use of a conductive epoxy as are the lead connections 16 from each field-defining element 15 to the lead pattern 24.

In utilizing the arrangement shown, the detector array must be utilized in a vacuum, as was the case in the aforesaid application, since the surface resistivity of the load resistors will be sensitive to humidity, and change with humidity. In the illustrated application the substrate 20 may be made of glass or any other suitable material for providing the proper leakage resistance to provide the high ohmic value of the load resistor. In cases where this is not required, different materials or substrates could be utilized; for example, a complete Mylar substrate may be desired.

As will be appreciated by those skilled in the art, various optical means which collect and image radiation on the transparent electrode 16 may be utilized, as well as mounting the detector array in a vacuum when the particular application so requires. The use of the transparent electrode with the field-defining electrodes on the opposite side away from the incident radiation offers a number of constructional advantages. Merely to recapitulate the construction, the pyroelectric array 10 can be made by lapping a large piece of crystal down to a thickness on the order of thousandths. Then the vacuum deposition of the transparent electrode is made on one side of the crystalline material 12 and the vacuum deposition of the field-defining electrodes 15 and their associated connections 16 is applied on the other side. The lead and load patterns are vacuum deposited on the substrate 20 and the strip 18 and the field-defining electrodes 15 are connected via leads 16 to the vacuum deposited lead pattern by use of conductive epoxies. The same thing is true of the field-effect transistor packs 28 and 30. The only external leads required are the ground leads 32 which connect the common transparent electrode 14 to the system ground. It is believed that the aforesaid construction makes it readily apparent that arrays constructed in accordance with the present invention are easier to assemble than would be physically isolated detectors. The interconnection concepts of the present invention permit the incorporation of electrical components in the lead pattern and the entire detector assembly is thus integrated.

We claim:

1. An infrared pyroelectric detector array having a plurality of individual detector elements on a common section of detector material for the detection of infrared radiation from a field of view comprising a. a common layer of pyroelectric material, b. a single, common, transparent electrode mounted on the side of said layer of pyroelectric material facing the direction in which infrared radiation is applied thereto, said single electrode being transparent to the infrared radiation applied thereto which is to be detected by said array, c. a plurality of separate, individual field-defining electrodes mounted on said layer of pyroelectric material opposite said common electrode forming therewith a plurality of individual detector elements, and d. an output lead connected to said common electrode and separate output leads connected to each of said plurality of individual field-defining electrodes.

2. An infrared pyroelectric detector array set forth in claim 1 including a substrate of insulating material having a lead pattern deposited thereon, said array mounted on said substrate with said separate output leads in conductive relation with said lead pattern.

3. An infrared pyroelectric array set forth in claim 1 including a substrate of insulating material having a depression therein, an insulating layer covering said depression, a lead pattern positioned on said substrate and said insulating layer, with said array mounted on said insulating layer with said separate output leads in conductive relation with said lead pattern.

4. An infrared pyroelectric array set forth in claim 3 wherein said lead pattern includes an electrical resistance element for each of said field-defining electrodes and a field-effect transistor connected to each resistance element.

5. An infrared pyroelectric detector array set forth in claim 2 wherein said layer of pyroelectric electric material and its associated electrodes are positioned centrally on said substrate with said lead pattern extending on both sides thereof.